United States Patent [19]
Klotz, Jr.

[11] Patent Number: 5,793,495
[45] Date of Patent: Aug. 11, 1998

[54] METHOD FOR AVOIDING CREATION OF DUPLICATE KEYWORD OBJECTS REPRESENTING USER ENTERED DATA ON A MACHINE READABLE FORM

[75] Inventor: Leigh L. Klotz, Jr., Palo Alto, Calif.

[73] Assignee: Xerox Corporation, Stamford, Conn.

[21] Appl. No.: 668,762

[22] Filed: Jun. 24, 1996

[51] Int. Cl.$^6$ ............................ H04N 1/00; H04N 1/32; G03G 21/00

[52] U.S. Cl. ............... 358/296; 358/403; 358/468; 399/81; 399/84

[58] Field of Search .................. 358/296, 400, 358/401, 403, 443, 447, 448, 468; 395/100, 101, 112–114; 399/81, 84

[56] References Cited

U.S. PATENT DOCUMENTS

| | | | |
|---|---|---|---|
| 4,716,438 | 12/1987 | Farrell | 355/6 |
| 4,893,333 | 1/1990 | Baran et al. | 358/468 X |
| 4,970,554 | 11/1990 | Rourke | 399/84 |
| 5,161,037 | 11/1992 | Saito | 358/468 |
| 5,251,297 | 10/1993 | Takayanagi | 358/296 X |
| 5,386,298 | 1/1995 | Bronnenberg et al. | 358/403 |
| 5,438,430 | 8/1995 | Mackinlay et al. | 358/448 X |
| 5,506,697 | 4/1996 | Li et al. | 358/448 |
| 5,563,986 | 10/1996 | Suzuki | 395/114 |
| 5,666,214 | 9/1997 | Mackinlay et al. | 358/401 X |

FOREIGN PATENT DOCUMENTS

| | | |
|---|---|---|
| 0621721A2 | 10/1994 | European Pat. Off. |
| 0635798A1 | 1/1995 | European Pat. Off. |

OTHER PUBLICATIONS

Huttenlocher, D.P., Klanderman, G.A., and Rucklidge, W.J., "Comparing Images Using the Hausdorff Distance", *IEEE Transactions on Pattern Analysis and Machine Intelligence*, Dept. of Computer Science, Cornell Univ., Ithaca, NY, CUCS TR 91–1211 (revised), Abstract, pp. 1–35.

Huttenlocher, D.P., and Rucklidge, W.J., "A Multi-Resolution Technique for Comparing Images Using the Hausdorff Distance", Department of Computer Science, Cornell Univ., Ithaca, N.Y., TR 92-1321, Dec. 1992, Abstract, pp. 1–20.

*Primary Examiner*—Eric Frahm
*Attorney, Agent, or Firm*—Richard B. Domingo

[57] ABSTRACT

A method for maintaining the uniqueness of user entered data in a system for processing machine readable forms. Use of such a method in a system for processing machine readable forms facilitates forms reuse by creating keyword objects for new instances of user entered data, thus avoiding the creation of duplicate data. When user entered data is encountered in a machine readable form, the user entered data is compared to keyword objects of previously encountered user entered data. If no match is found, a new keyword object is created for the user entered data. Otherwise, it is assumed that the user entered data is a copy of previously entered data.

10 Claims, 6 Drawing Sheets

METHOD FOR AVOIDING CREATION OF DUPLICATE KEYWORD OBJECTS REPRESENTING USER ENTERED DATA ON A MACHINE READABLE FORM

FIELD OF THE INVENTION

The present invention relates to the field of user interfaces for interacting with computer based systems, and in particular to paper based user interfaces.

BACKGROUND OF THE INVENTION

Machine readable forms have been in common use for some time. Such forms provide a mechanism for enabling action to be taken based on marks on a paper without requiring human intervention such as reading or interpreting the forms. The marks on such forms are extracted under the control of a device commonly to referred to as a form interpreter. The forms are typically "read" by an optical scanner or the like, and the form interpreter then locates and characterizes the marks on the forms, and may take action, e.g. output control signals to peripheral devices as a function of the presence, location, nature, etc., of the marks.

A variety of techniques, such as check boxes, signature regions, and highlighting, have been developed to allow a form interpreter to read and interpret marks placed on a machine readable form. Using basic image processing techniques, marks made in designated areas (hereinafter referred to as "active areas") on the form can be read from a scanned image of the form, producing data that can be used as input to a data processing system. An example of a system using such form processing techniques is the PaperWorks™ product developed by the Xerox Corporation of Stamford Conn. An example of a system which enables creation of applications utilizing such form processing techniques is the SmartPaper™ product developed by and available from the Xerox Corporation of Stamford, Connecticut.

It has also been proposed to use forms to control operation of digital reprographic devices. For example see U.S. Pat. No. 4,716,438, entitled "High Speed Electronic Reprographic/Printing Machine" which describes a system wherein bar codes on a document are used to control operation of a reprographic device. Such operational control is termed a paper user interface.

Typically, for paper user interfaces the forms to be used to control operation are stored on the system itself and are printed out for use. To avoid having to print a form out for every use, a common practice is to simply re-use forms or to photocopy forms for subsequent use.

A problem occurs when the operation being controlled by the form assumes that each received instance of the control form is unique. When two instances of the same form are processed, undesirable results may occur. This is particularly true when the form permits some handwritten data to be entered and stored. Subsequent uses of the form with the handwritten data may cause the handwritten data to be stored multiple times. For example, consider an application which permits a user to store a document and to assign a handwritten symbol, such as a keyword or graphic, to the document. The handwritten symbol is used for subsequent search and retrieval of the document or for organization of the document in a file system. So if a form having handwritten data is unknowingly used multiple times to store different documents, a subsequent retrieval may not retrieve all documents that "should be" associated with that keyword. This is because multiple different instances of the same keyword are created, and the one selected for retrieval may not encompass all the different instances.

One solution to the problem is to always insure that each form used is unique. In other words, forms cannot be reused. However, this takes away from some of the flexibility of a paper user interface. Another solution would be to provide another control form which could be used to edit out unwanted data. The drawback to this is that it does not address the inherent problem, only a symptom of the problem.

The optimal solution would be one where the system would recognize uniqueness of user entered data on a form. This would eliminate the need for a user to have to manage this aspect of a system. Thus, for a paper user interface it would be desirable to have a means for maintaining the uniqueness of user entered data on a form.

SUMMARY

The present invention is for use on a system which uses forms for controlling various system operations. Such a system is referred to as having a paper user interface. The present invention provides a means for robust form reuse by eliminating redundancies and ambiguities that may arise from user entered data being present on reused forms. The present invention is premised on a method by which user entered data on a form retains its uniqueness. In the method, a keyword object is created for each unique instance of user entered data. The keyword object is compared to subsequent instances of forms having user entered data at the same location.

The method of the present invention is generally comprised of the steps of: receiving a bit mapped image of a form, identifying the form and retrieving associated form control information, identifying the active areas on said form which may contain user entered data, checking if the active area has any user entered data, if user entered data is present in an active area deriving identifying information for said user entered data, comparing said identifying information for said user entered to keyword objects of previous user entered information, if said identifying information for said hand written data matches any keyword object of known user entered data, determining that said user entered information is not unique; and if said identifying information for said user entered data does not match any keyword object of previous user entered data determining said user entered information is unique and storing said identifying information as a keyword object of previous user entered data.

The keyword object is comprised of a form identifier, a position (e.g. the active area in which the user entered data is written), and a bitmapped representation of the user entered data. The comparison step of the recited method is a strict comparison of form identifiers and "closeness" comparison of the position and bitmapped representations. Comparison of the bitmapped representation of the user entered data is necessary because the form identifier and position information is not enough (because users will typically photocopy a form for reuse). Known forms of comparing bit maps are utilized to determine that a match is "close enough" so that a new keyword need not be created.

3

DETAILED DESCRIPTION OF THE PREFERRED EMBODIMENT

A method for use in a paper user interface by which user entered data on a form retains its uniqueness. By maintaining such uniqueness, when forms are re-used, the creation of duplicate objects representing the user entered data is avoided. The present invention has been implemented for use in a digital document management system which is described below with reference to FIG. 4.

The present invention overcomes a problem associated with paper user interfaces relating to form reuse described, namely creating duplicate instances of user entered data. While the currently preferred embodiment is described with reference to a document storage and retrieval function, it would be apparent to one of skill in the art to apply the present invention to other functions utilizing image processing where it is important to maintain the uniqueness of user entered data (e.g. a user entered Userid). Any function that would require user entered data to be unique may utilize the present invention.

The document storage and retrieval function of the currently preferred embodiment provides for scanning images of documents and for storing them for subsequent retrieval via a paper based user interface. Keywords in the form of handwritten text or graphics may be assigned to documents to facilitate searching for documents. For the currently preferred embodiment, it is the ability to maintain the uniqueness of handwritten keywords that the present invention provides.

Figure 1:
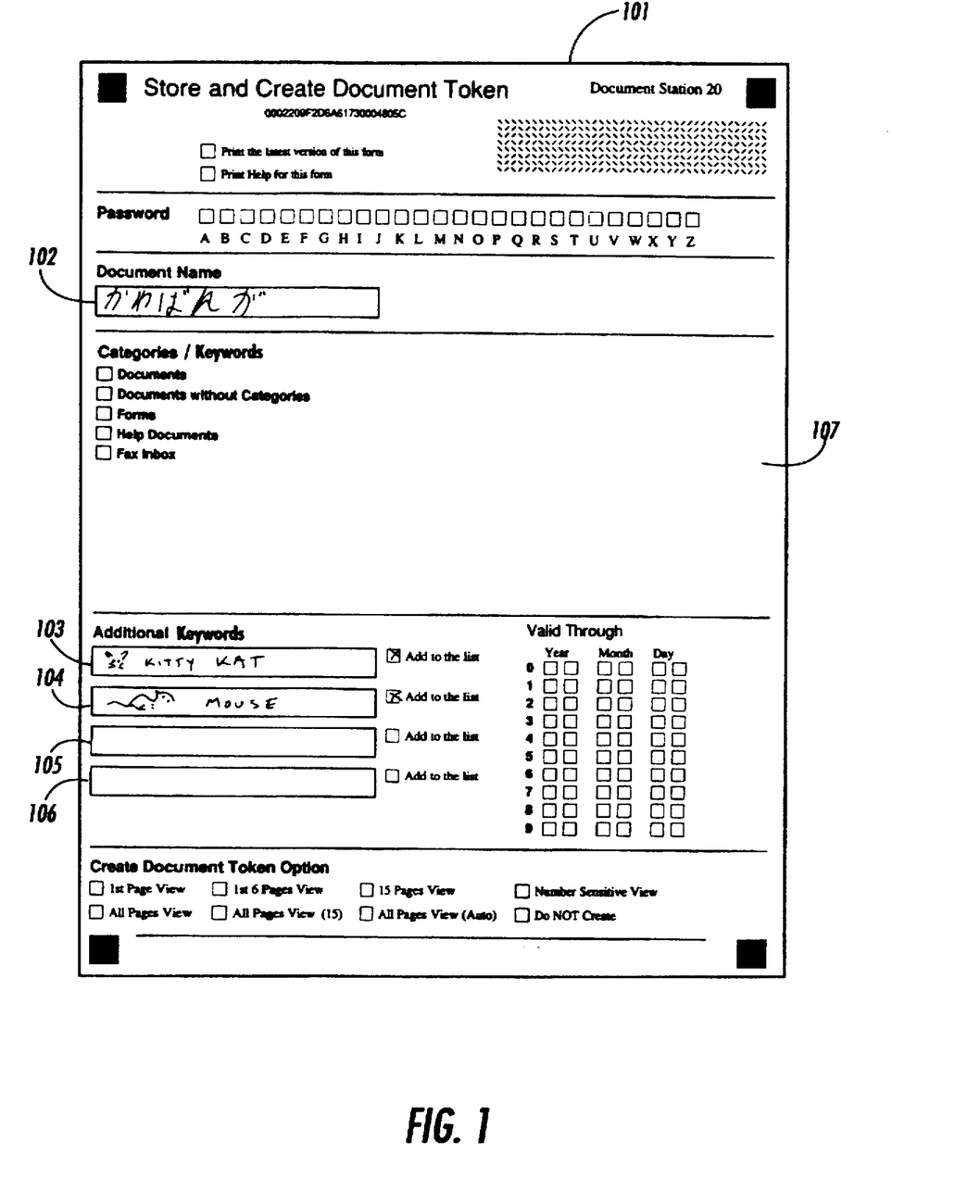
FIGS. 1–3 are a sequence of machine readable forms which illustrate the creation of duplicate keyword objects.

Understanding the present invention is aided by an understanding the problem being solved. The problem sought to be corrected by the present invention is illustrated with reference to the control forms illustrated in FIGS. 1–3. Referring to FIG. 1, a control form 101 is provided for storing a document and creating a document token. A document token is a single page that is used to represent a stored document. Document tokens are described in greater detail in EPA 0 621 721 A2 entitled "Document Surrogates", which is assigned to the same assignee as the present application. In any event, control form 101 has a plurality of active areas wherein user data can be entered, specifically a document name area 102 and four additional categories areas 103–106. The additional categories areas 103–106 are for providing "additional" keywords for the document. The keywords are additional because a set of keywords or categories may have been previously defined by the user. It should be noted that areas 103 and 104 contain user entered data, and have associated checkboxes checked to add to the list of keywords. The form 101 also has a categories/keywords area 107. In the categories/keywords area 107 are listed existing categories and keywords which may be assigned to the stored document by checking the corresponding checkbox.

Figure 2:
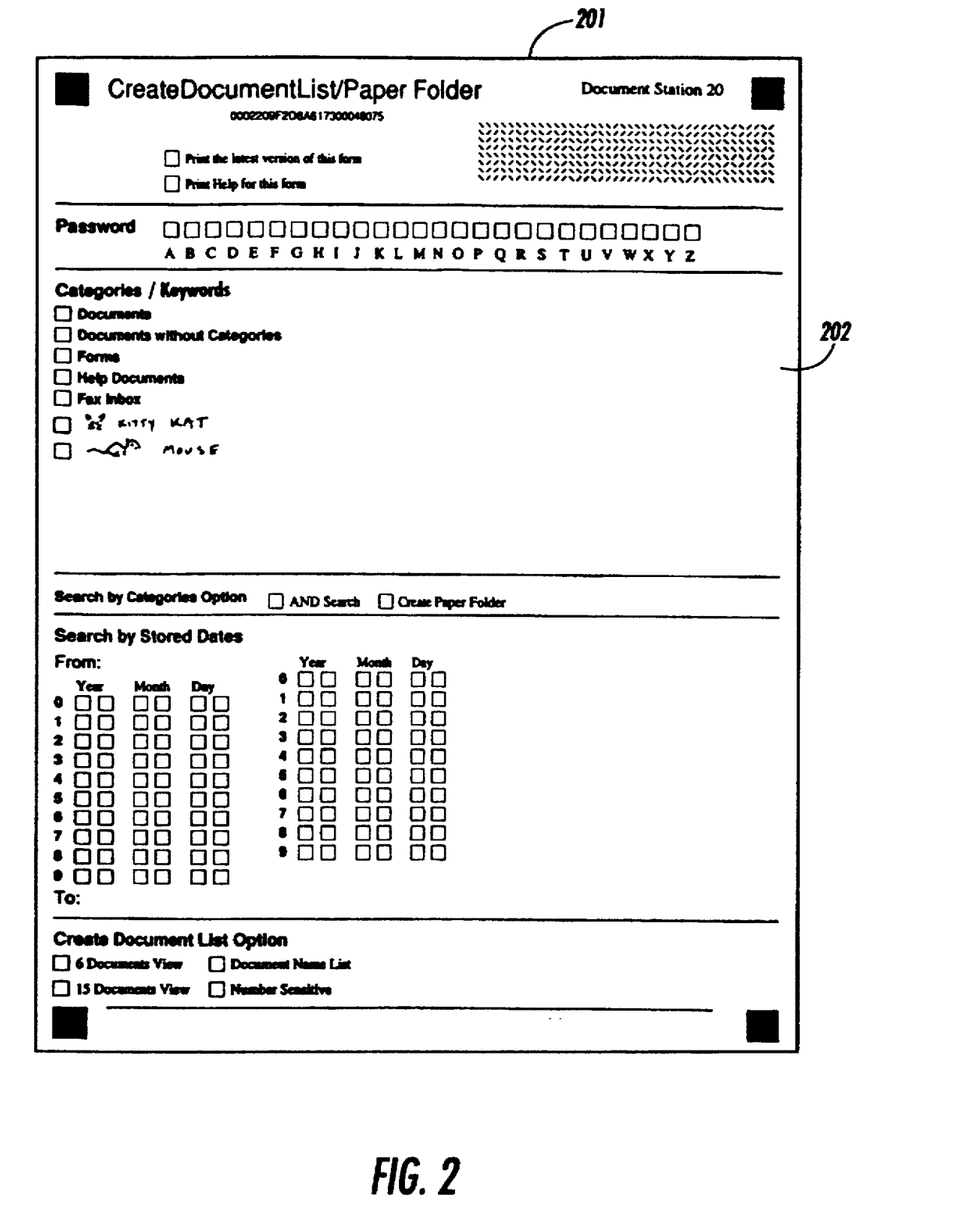

Referring now to FIG. 2, a control form 201 is used to create a list of stored documents. The control form 201 has been generated by the system subsequent to the processing of control form 101. This is akin to searching a document storage and obtaining a list of documents matching the search criteria. The control form 201 also includes a categories/keywords area 202. It should be noted that at this point in time, the categories/keywords area includes the user entered categories entered in areas 103 and 104 for control form 101.

Now suppose that control form 101 is reused for a different document to store and create a document token. The result is illustrated in the control form of FIG. 3. The control form 301 is the same type of form as illustrated in FIG. 2, namely one to create a list of stored documents. However, this form has been generated by the system after the control form 101 has been used a second time. The result here is that categories/keywords area 302 has the user entered categories, i.e. sub areas 103 and 104 of form 101 duplicated. This duplication may lead to erroneous retrieval results if the user does not check every instance of the same category since the system may treat them as different categories (which was clearly not the intention of the user).

Figure 3:
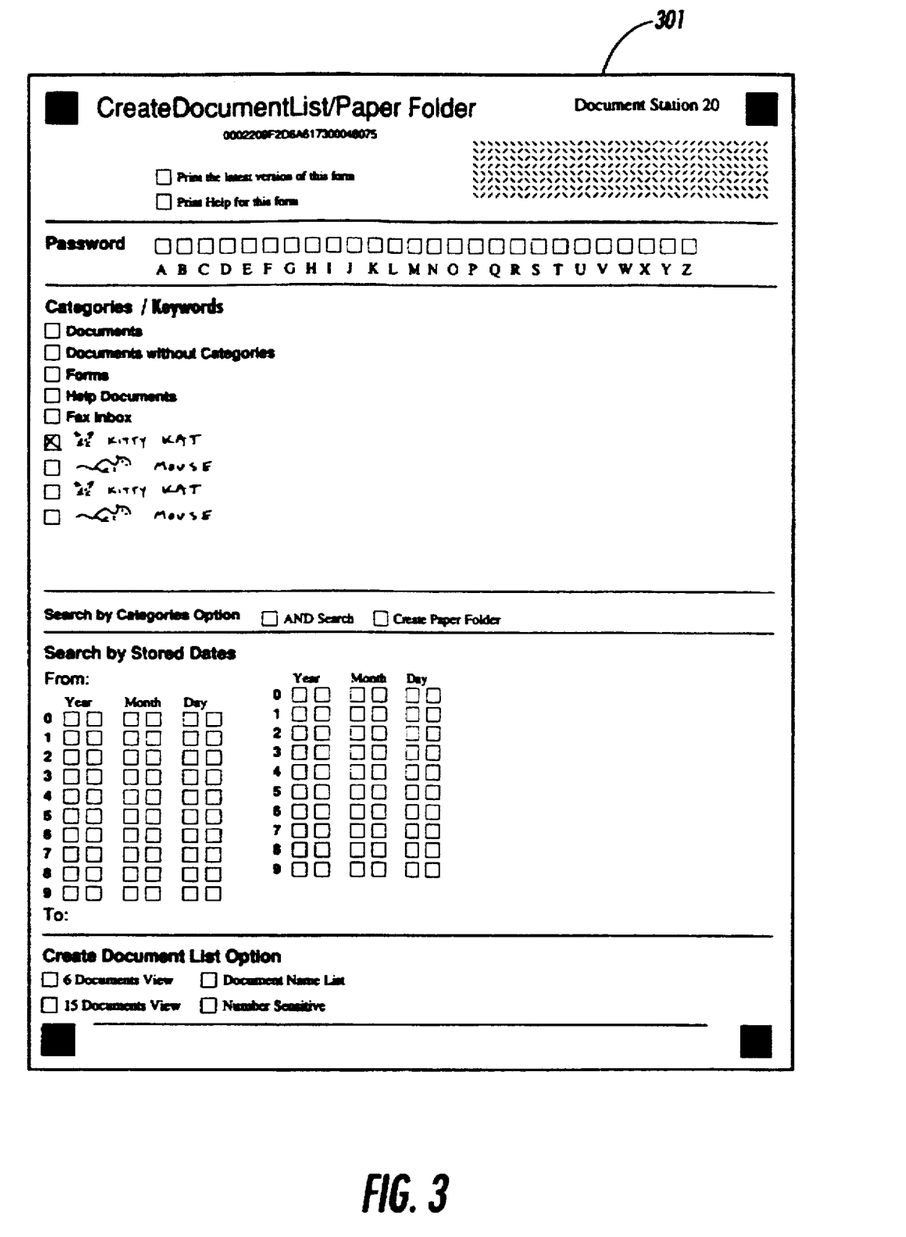

The resulting duplication illustrated in FIG. 3 is caused by the fact that the system has not differentiated between the first and second instances of using form 101. The system merely followed the instructions contained in the control form to create additional keywords and add to the list of keywords.

Overview of a Digital Document Management System

Figure 4:
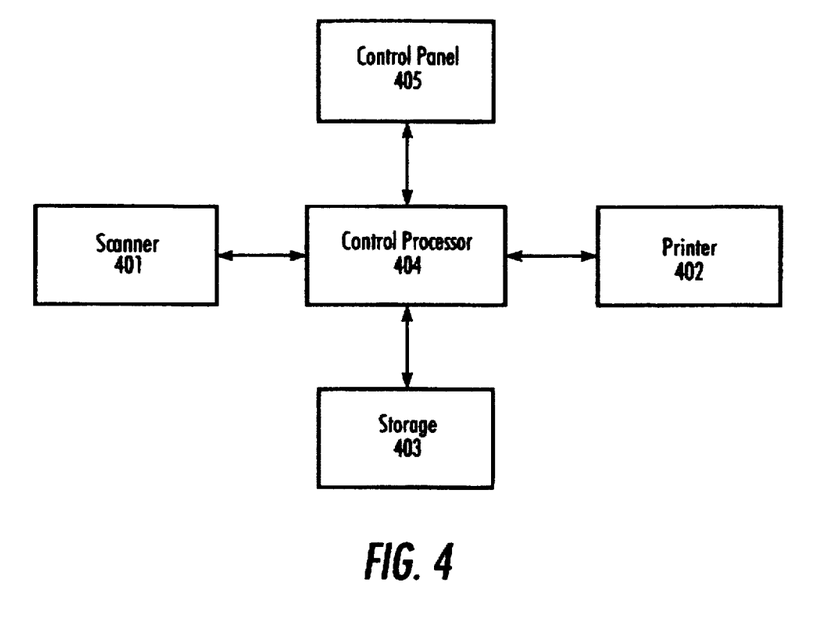
FIG. 4 is a block diagram of a digital document management system in which the currently preferred embodiment of the present invention may be utilized.

FIG. 4 is a block diagram representation of a digital document management system on which the currently preferred embodiment of the present invention may be used. Referring to FIG. 4, the digital document management system is comprised of a scanner 401 for creating a bit-mapped representation of a document, a printer 402 for generating a print image of a document, storage element 403 for providing persistent storage of documents, and control processor 404 for controlling operation of the document management system. Also illustrated, is a control panel interface 405. The control panel interface 405 may be found on some implementations of a document management systems and is for inputting function control signals via buttons, e.g. a button to invoke a document "store" function.

The currently preferred embodiment has been implemented for use on a document management system such as the Docustation IM-2000 available in Japan from Fuji Xerox of Tokyo, Japan.

Figure 5:
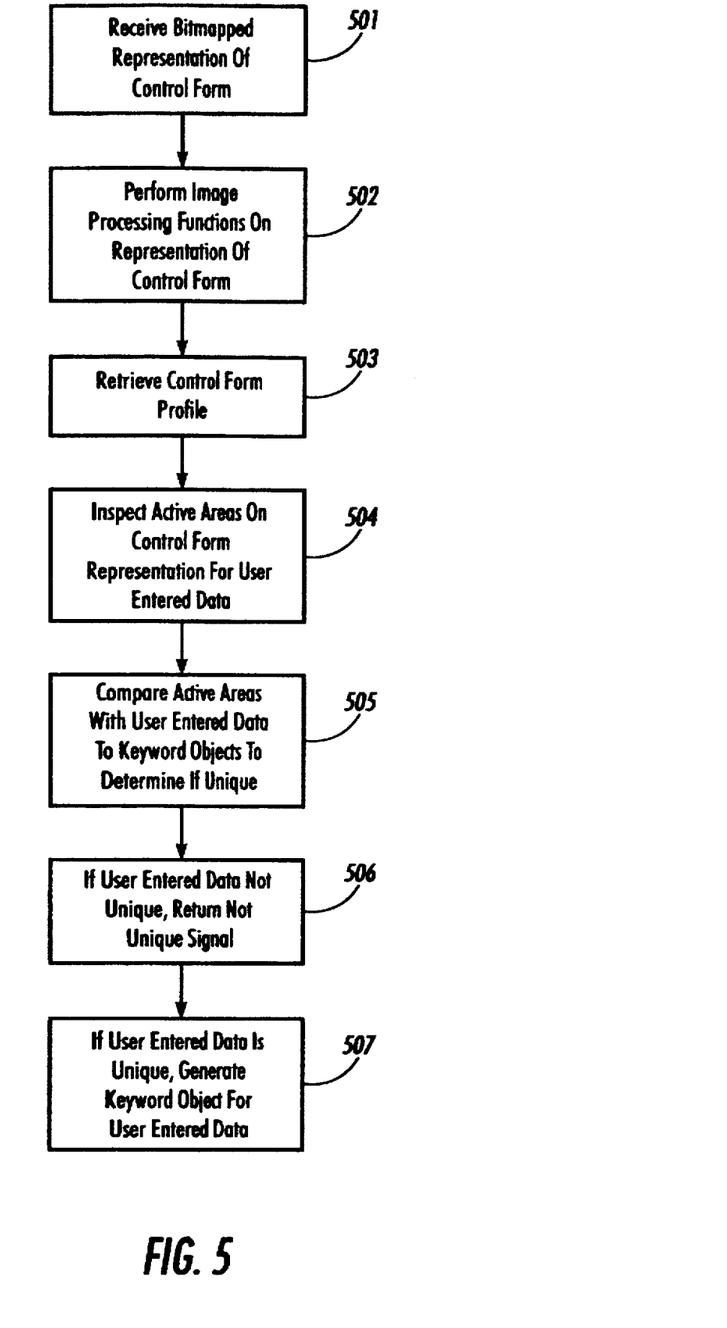
FIG. 5 is a flow diagram illustrating the basic steps performed by a control processor when processing a control form in the currently preferred embodiment of the present invention.

FIG. 5 is a flow diagram illustrating the basic steps performed by the control processor 404 when processing a control form capable of having user entered data. In order not to obscure the present invention, it is assumed that from a stream of document pages, a control form capable of having user entered data has been identified and extracted. Various well known techniques are used to accomplish this. In any event, first a bit-mapped representation of a control form is received, step 501. Various image processing operations are performed on the representation of the control form, step 502. Such image processing operations may include de-skewing or other image clean-up functions. A profile of the control form is retrieved, step 503. This control form profile is used to identify how the form is to be processed, and for the purposes of the present invention, the "active areas" form, i.e. those areas which may contain user entered data. It should be noted that not all user entered data is worth preserving as unique. For example, a form which allows a user to select amongst a check-box menu of functions may not require that a checked box be unique. Various techniques exist in the art for both form generation and for designating action to be taken responsive to a mark found in a particular check-box.

The active areas which may contain unique user entered data are then inspected, step 504. For active areas which contain user entered data, comparison to keyword objects is performed, step 505. The comparison is comprised of comparing identifying information for the user entered data on the form, with keyword objects for previous user entered data. The keyword object for previous user entered data is retained upon a first occurrence of the user entered data.

If the user entered data is found to not be unique, control is returned to the application performing the function associated with the control form with a signal that user entered data is not unique, step 506. If the user entered data is found to be unique, the identifying information is stored as a keyword object for previous user entered data, step 507. Control is then returned to the application performing the function associated with the control form with a signal that the user entered data is unique, step 508.

Keyword Objects

Figure 6:
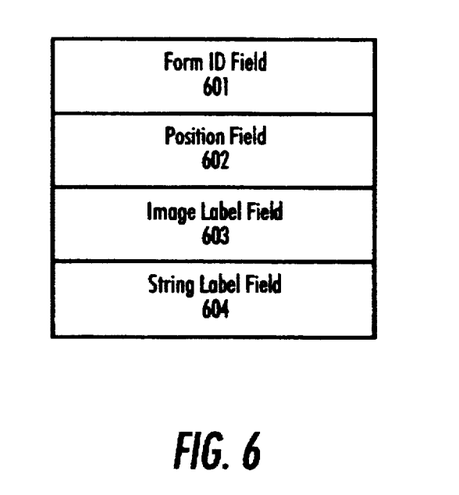
FIG. 6 is a block diagram of the data structure for a keyword object as may be utilized in the currently preferred embodiment of the present invention.

The identifying information described in FIG. 5 is in the form of a keyword object. It should be noted that the term "keyword" object is merely descriptive of the currently preferred embodiment and it not meant to be limiting the uses in which the present invention may be used. In the currently preferred embodiment, the keyword objects will represent unique instances of keywords. The data structure of the keyword object is illustrated in FIG. 6. Referring to FIG. 6, a keyword object will contain a form id field 601, position field 602, an image label field 603 and a string label field 604.

The form id field 601 is used to identify the form which created the object. The form id may be a form number, or a form number along with a numeric instance of the form (e.g. the is the 10th copy of the form to be printed out).

The position field 602 corresponds to the active area into which the keyword was entered.

The image label field 603 is a pointer to a clipped image containing the user entered data. The clipped image is typically a bitmap of the user entered data that was "clipped" from the bitmap of the form. It is this clipped image which will be used to compare to other "close" instances of user entered data in the same active area.

The string label field 604 is used to identify a string in the alternative to user entered data. In the currently preferred embodiment, the user entered data is a keyword so such a string keyword is one that has generated by the system and is not user entered data. However, in some applications where uniqueness of user entered data is maintained, such string information may not be needed.

The keyword objects may be stored in a suitable data structure, e.g. a look-up table that is indexed by the form id field, or a hash table with the form id as the hash key.

Comparing User Entered Data With Keyword objects

Figure 7:
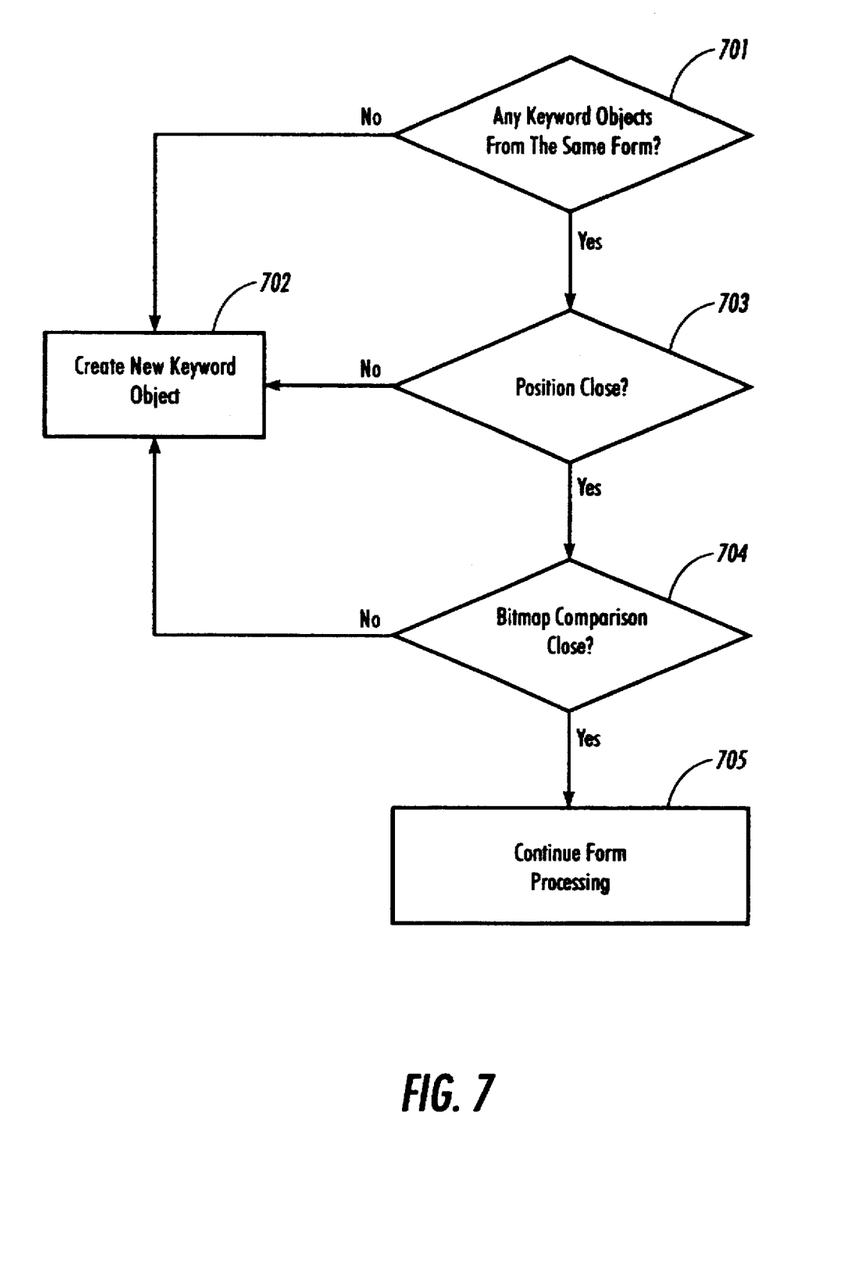
FIG. 7 is a flow diagram illustrating the comparison of an instance of user entered data with keyword objects as may be performed in the currently preferred embodiment of the present invention.

Comparing user entered data is really a check to determine if a form is being reused. FIG. 7 is a flowchart illustrating the steps for comparing the user entered data with keyword objects. Referring to FIG. 7, first it is determined if any keyword objects are from the same form as the one containing the existing user entered data, step 701. This is accomplished by checking if any keyword objects exists having the same form ID. If no keyword objects exist having the same form ID, a new keyword object is created from the user entered data, step 702. Creation of a new keyword object is merely the task of entering the form ID, positional information and bit-map information into the keyword object data structure.

If a keyword objects exist having the same form ID, it is determined if the position information is close, step 703. This comparison will generally look to see if the user entered data is contained in the same active area as the keyword object. Generally, because of scanning or other photocopying effects the user entered data may not be in the same "exact" area as defined in the keyword object. So a test for "close", e.g. within a predetermined tolerance of pixels in any direction is used. Generally, this measure of closeness in the system may be the same tolerance used to identify active areas in the bitmapped representation of control forms. In any event, if no keyword objects exists that is "close", then a new keyword object is created from the user entered data, per step 702.

If the keyword object is "close", then a bitmap comparison takes place, step 704. Again, the matches merely need to be close. The bitmap comparison used is bi-directional. The comparison must be bi-directional in order to avoid matches on user entered data on a form that has been erased or which has been appended to (described below). The bitmap comparison of the present invention is somewhat simplified because at this point what is being compared is the same user entered data, but on different instances of paper. Thus, they will have a high degree of correlation. The bitmap comparison technique is tuned to identify scanning and or reproduction artifacts (e.g. quantization, noise or skew). So a method which employs a dilation of the symbol in the bitmaps is preferred. A suitable bitmap comparison technique is a bi-directional percentage match Hausdorff method where the symbol being matched to is dilated. The percentage match will generally be very high and will depend on the resolution of the scanning means used to obtain the bit-map image. However, it should be noted that use of other bitmap comparison techniques would not depart from the spirit and scope of the present invention.

Besides helping to avoid the creation of duplicate keyword objects, the bitmap comparison will permit new keywords to be created when the original user entered data on a copied form is modified, e.g. there was erasure of or additions to user entered data. In the case of erasure, a form may be used where a user erased a portion of a keyword. For example, if the original form had the keyword "Trade Shows", the term "Trade" may be erased leaving "Shows". Clearly, this is a new keyword on the same form id and at the same position, so a new keyword object is created. In the case of addition a form is used where a user has added to an existing keyword. So for example, if the original form had the keyword "Trade Shows", the term "1996" may be added to yield a keyword of "Trade Shows 1996". Again, a new keyword object generated.

If it is determined that no match of the bitmap exists, then a new keyword object is created, step 702. If it is determined that a match does exist, then the normal form processing continues, step 705.

Thus, a method for maintaining the uniqueness of user entered data is disclosed. While the present invention is described with respect to a preferred embodiment, it would be apparent to one skilled in the art to practice the present invention with other configurations of digital document management systems. Such alternate embodiments would not cause departure from the spirit and scope of the present invention. For example, the present invention may be implemented as software instructions residing on a suitable memory medium for use in operating a computer based system.

I claim:

1. A method for processing a machine readable form having at least a first active area which may contain user entered data, said method for identifying unique instances of user entered data, said method comprising the steps of:

a) receiving a first scanned representation of said form, said first scanned representation having first unique user data in said first active area;

b) detecting said first unique user data in said first active area;

c) generating a first keyword object for said first unique user entered data;

d) storing said first keyword object for said first unique user data;

e) receiving a second scanned representation of said form;

f) detecting that user entered data is contained in said first active area of said second scanned representation of said form;

g) generating identifying information for said user entered data contained in said first active area of said second scanned representation of said form;

h) comparing said identifying information for said user entered data to said stored first keyword object for said first unique user data;

i) if said identifying information is the same, processing said user entered data as existing data; and j) if said identifying information is not the same, generating and storing a second keyword object using said identifying information for said user entered data as second unique data.

2. The method as recited in claim 1 wherein said step of generating a first keyword object for said first unique user data is further comprised of the steps of:

c1) determining a form identifier and storing in a form identifier field of a first keyword object data structure;

c2) determining the location of said first active area and storing in a position field of said first keyword object data structure; and c3) extracting a bitmapped representation of said first unique data from said scanned representation and storing in an image field of said first keyword object data structure.

3. The method as recited in claim 2 wherein said machine readable form has printed thereon form identification information and said step of generating identifying information for said user entered data contained in said first active area of said second scanned representation of said form is further comprised of the steps of:

g1) determining a form identifier from said form identification information printed thereon and providing as first identifying information;

g2) determining the location of the active area containing the user entered data and providing as second identifying information; and g3) extracting a bitmapped representation of said first unique data from said scanned representation and providing as third identifying information.

4. The method as recited in claim 3 wherein said step of comparing said identifying information for said user entered data to said stored first keyword object for said first unique user data if further comprising the steps of:

h1) comparing said first identifying information with the contents of said identifier field of said first keyword object data structure and if not identical, indicating identifying information is not the same;

h2) comparing said second identifying information with the contents of said position field of said first keyword object data structure and if they are not close, indicating identifying information is not the same;

h3) comparing said third identifying information with the contents of said image field of said first keyword object data structure and if not close, indicating identifying information is not the same; and h4) indicating identifying information is the same as first keyword object if no prior step has indicated that identifying information is not the same.

5. The method as recited in claim 4 wherein said step of comparing said third identifying information with the contents of said image field of said first keyword object data structure is performed using a Hausdorff image comparison technique.

6. The method as recited in claim 4 wherein said keyword object represents a unique keyword.

7. A forms processing system for processing machine readable forms, said forms processing system comprising:

a scanner for generating a bit mapped representation of a form;

first storage means for storing form layout information for forms capable of being processed by said forms processing system;

active area identification means for identifying active areas in a form, said active areas for containing user entered data;

means for determining if user entered data in an active area is unique;

means for generating a keyword object for unique user entered data; and second storage means for storing keyword objects.

8. The forms processing system as recited in claim 7 wherein said means for determining if user entered data in an active area is unique is further comprised of:

means for extracting identifying information of user entered data in an active area;

comparison means for comparing identifying information of said user entered data with keyword objects stored in said second storage means.

9. The forms processing system as recited in claim 8 wherein said means for generating identifying information for said unique user entered data is further comprised of:

means for determining a forms identifier for said form and providing as first identifying information;

means for determining a position of said active area in which said unique user entered data is contained and providing as second identifying information; and means for extracting a bit mapped representation of said unique user entered data from said bit mapped representation of said form and providing as said third identifying information.

10. A program storage device readable by a machine, tangibly embodying a program of instructions executable by the machine to perform method steps for processing machine readable forms and avoiding duplication of user entered data by identifying unique instances of user entered data, said method steps comprising:

a) receiving a first scanned representation of said form, said first scanned representation having first unique user data in said first active area;
   b) detecting said first unique user data in said first active area;
   c) generating a first keyword object for said first unique user entered data;
   d) storing said first keyword object for said first unique user data;
   e) receiving a second scanned representation of said form;
   f) detecting that user entered data is contained in said first active area of said second scanned representation of said form;
   g) generating identifying information for said user entered data contained in said first active area of said second scanned representation of said form;
   h) comparing said identifying information for said user entered data to said stored first keyword object for said first unique user data;
   i) if said identifying information is the same, processing said user entered data as existing data; and
   j) if said identifying information is not the same, generating and storing a second keyword object using said identifying information for said user entered data as second unique data.

* * * * *